(12) United States Patent
Whitehead et al.

(10) Patent No.: US 9,324,253 B2
(45) Date of Patent: Apr. 26, 2016

(54) MODULAR ELECTRONIC DISPLAYS

(75) Inventors: Lorne A. Whitehead, Vancouver (CA);
Gregory John Ward, Albany, CA (US);
Helge Seetzen, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 924 days.

(21) Appl. No.: 12/096,341

(22) PCT Filed: Apr. 18, 2006

(86) PCT No.: PCT/CA2006/000542
§ 371 (c)(1),
(2), (4) Date: Jun. 5, 2008

(87) PCT Pub. No.: WO2007/065244
PCT Pub. Date: Jun. 14, 2007

(65) Prior Publication Data
US 2008/0284677 A1 Nov. 20, 2008

Related U.S. Application Data (60) Provisional application No. 60/748,125, filed on Dec. 6, 2005.

(51) Int. Cl.
| | |
|---|---|
| *G06F 3/14* | (2006.01) |
| *G09G 3/20* | (2006.01) |
| *G09G 3/34* | (2006.01) |
| *H04N 9/12* | (2006.01) |
| *H04N 9/31* | (2006.01) |

(52) U.S. Cl.
CPC ............. *G09G 3/20* (2013.01); *G06F 3/1446* (2013.01); *G09G 3/3426* (2013.01); *H04N 9/12* (2013.01); *H04N 9/3155* (2013.01); *H04N 9/3158* (2013.01); *H04N 9/3164* (2013.01); *H04N 9/3194* (2013.01); *H04N 9/3197* (2013.01); *G09G 2300/026* (2013.01); *G09G 2320/0646* (2013.01); *G09G 2320/0693* (2013.01); *G09G 2330/08* (2013.01); *G09G 2360/145* (2013.01); *G09G 2360/16* (2013.01)

(58) Field of Classification Search
None
See application file for complete search history.

(56) References Cited

U.S. PATENT DOCUMENTS

| | | | | | |
|---|---|---|---|---|---|
| 3,909,525 | A | * | 9/1975 | Fagan | 348/383 |
| 4,734,779 | A | * | 3/1988 | Levis et al. | 348/383 |
| 5,111,337 | A | * | 5/1992 | Martinez | 359/443 |
| 5,461,437 | A | * | 10/1995 | Tanaka et al. | 353/71 |
| 5,956,000 | A | * | 9/1999 | Kreitman et al. | 345/1.3 |
| 6,008,484 | A | * | 12/1999 | Woodgate et al. | 250/201.1 |
| 6,054,832 | A | * | 4/2000 | Kunzman et al. | 318/600 |

(Continued)

FOREIGN PATENT DOCUMENTS

| | | | | |
|---|---|---|---|---|
| CN | 14552925 A | | 11/2003 | |
| EP | 1134610 A2 | * | 9/2001 | ............. G03B 21/10 |

(Continued)

OTHER PUBLICATIONS

International Search Report PCT/CA2006/000542, date of mailing Aug. 28, 2006, International Filing Date Apr. 18, 2006.

*Primary Examiner* — Antonio Xavier (57) ABSTRACT

Modular displays are made up of arrays of modules that include light sources and light modulators. The modules may include control circuits that perform some image processing functions. The modules may illuminate a screen directly or may include optical systems that project light onto a screen.

42 Claims, 6 Drawing Sheets

(56) References Cited

U.S. PATENT DOCUMENTS

| | | | |
|---|---|---|---|
| 6,191,800 B1* | 2/2001 | Arenburg et al. | 345/505 |
| 6,232,932 B1* | 5/2001 | Thorner | 345/1.3 |
| 6,310,650 B1* | 10/2001 | Johnson et al. | 348/383 |
| 6,520,643 B1* | 2/2003 | Holman et al. | 353/20 |
| 6,593,902 B1* | 7/2003 | Ogino et al. | 345/55 |
| 6,611,241 B1* | 8/2003 | Firester et al. | 345/1.3 |
| 6,637,887 B2* | 10/2003 | Yamanaka | 353/30 |
| 6,718,104 B2 | 4/2004 | Lowry | |
| 6,727,864 B1* | 4/2004 | Johnson et al. | 345/1.3 |
| 6,891,672 B2* | 5/2005 | Whitehead et al. | 359/443 |
| 6,999,045 B2 | 2/2006 | Cok | |
| 7,108,392 B2 | 9/2006 | Strip et al. | |
| 7,688,280 B2* | 3/2010 | Callegari et al. | 345/1.3 |
| 2001/0038387 A1* | 11/2001 | Tomooka et al. | 345/520 |
| 2002/0041708 A1* | 4/2002 | Pettitt | 382/167 |
| 2002/0057361 A1* | 5/2002 | Mayer, III et al. | 348/383 |
| 2002/0070944 A1* | 6/2002 | Deering | 345/581 |
| 2002/0080302 A1 | 6/2002 | Dubin et al. | |
| 2002/0135795 A1* | 9/2002 | Kwok et al. | 358/1.15 |
| 2002/0154145 A1* | 10/2002 | Isakovic et al. | 345/643 |
| 2002/0186956 A1 | 12/2002 | Lowry | |
| 2003/0020412 A1 | 1/2003 | Luerkens et al. | |
| 2003/0035979 A1* | 2/2003 | Chen et al. | 428/690 |
| 2003/0064174 A1* | 4/2003 | Miteva et al. | 428/1.1 |
| 2004/0008155 A1* | 1/2004 | Cok | 345/1.3 |
| 2004/0085256 A1* | 5/2004 | Hereld et al. | 345/1.1 |
| 2004/0135482 A1 | 7/2004 | Thielemans et al. | |
| 2004/0207821 A1* | 10/2004 | Roddy et al. | 353/94 |
| 2005/0018082 A1* | 1/2005 | Larsen et al. | 348/563 |
| 2005/0105160 A1* | 5/2005 | Huibers | 359/291 |
| 2005/0134526 A1* | 6/2005 | Willem et al. | 345/1.3 |
| 2005/0162737 A1 | 7/2005 | Whitehead et al. | |
| 2005/0248554 A1 | 11/2005 | Feng et al. | |
| 2007/0164926 A1* | 7/2007 | Suzuki | 345/10 |

FOREIGN PATENT DOCUMENTS

| | | |
|---|---|---|
| EP | 1361753 A2 | 11/2003 |
| EP | 1705907 A1 | 9/2006 |
| JP | 10-78766 | 3/1998 |
| JP | 10-254388 | 9/1998 |
| JP | 10-301202 | 11/1998 |
| JP | 2000-350230 | 12/2000 |
| JP | 2001-36148 | 2/2001 |
| JP | 2002-207247 | 7/2002 |
| JP | 2003-15532 | 1/2003 |
| JP | 2003-280092 A | 10/2003 |
| JP | 2005-39849 A | 2/2005 |
| JP | 2005-167680 A | 6/2005 |
| JP | 2005-173119 A | 6/2005 |
| JP | 2005-258404 A | 9/2005 |
| JP | 2005-275346 A | 10/2005 |
| KR | 2003-0011622 A | 2/2003 |
| WO | 0104716 A1 | 3/1999 |
| WO | 00/23976 | 4/2000 |
| WO | 01/88576 | 11/2001 |
| WO | 2005055598 A1 | 6/2005 |

* cited by examiner

MODULAR ELECTRONIC DISPLAYS

CROSS-REFERENCE TO RELATED APPLICATION

This application claims priority from U.S. patent application Ser. No. 60/748,125 filed on 6 Dec. 2005 and entitled MODULAR ELECTRONIC DISPLAYS, which is hereby incorporated herein by reference. For purposes of the United States, this application claims the benefit of U.S. patent application Ser. No. 60/748,125 under 35 U.S.C. §119.

TECHNICAL FIELD

The invention relates to displays for computers, cinemas, televisions and the like. Some embodiments of the invention provide projection-type displays. Other embodiments of the invention provide display screens.

BACKGROUND

U.S. Pat. No. 6,891,762 discloses displays in which the light output for each pixel is determined by two signals. In some embodiments, one signal controls the light transmission of a first light modulator and a second signal controls the intensity of the light that is incident on a part of the light modulator that corresponds to the pixel. The second signal may control directly a light source, such as a light emitting diode (LED) that illuminates a portion of the first light modulator, or may control a modulator located between a light source and the first light modulator.

There is a need for electronic displays that are reliable and cost-efficient to manufacture and repair. There is a particular need for such displays that can provide high dynamic ranges. Such needs exist for both projection-type displays and displays that have an integrated screen.

SUMMARY OF THE INVENTION

One aspect of the invention provides displays that comprise a plurality of modules. Each of the modules comprises a light source and a spatial light modulator disposed to modulate light emitted by the light source in response to image data. The display also includes a screen illuminated by the plurality of modules. In some embodiments, each module comprises a processor connected to receive a data signal carrying the image data and to generate a driving signal for the light modulator based on the image data.

Another aspect of the invention provides methods for displaying images on a screen. The methods comprise providing a plurality of modules each comprising an image projector capable of projecting a part of an image onto an area of the screen corresponding to the module. Each of the modules has a corresponding processor. Each of the processors has access to a digital responsibility map corresponding to the corresponding module. The method provides image data defining an image to be projected on the screen to all of the processors, the image covering a plurality of the areas; operates each of the processors to identify using the responsibility map, and to extract from the image data, a subset of the image data corresponding to the area corresponding to the corresponding module, and operates each of the modules to project onto the screen a part of an image defined by the subset of the image data extracted by the corresponding processor.

Another aspect of the invention provides methods for calibrating display systems. The methods comprise operating each of the modules of a display system to display on a screen a pattern indicative of the location of an area of the screen corresponding to the module, acquiring one or more images including each of the displayed patterns, and generating a responsibility map identifying the area of the screen corresponding to each of the modules by processing the one or more images.

Further aspects of the invention and features of specific embodiments of the invention are described below.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention relates to displays of the type in which light from an array of light sources is modulated to yield an image on a screen. In preferred embodiments, the intensity of light emitted by each of the light sources is modulated by controlling the light source and the emitted light is modulated by a light modulator after it has been emitted. The light sources and light modulators are disposed in modules that can be individually replaced.

Figure 1:
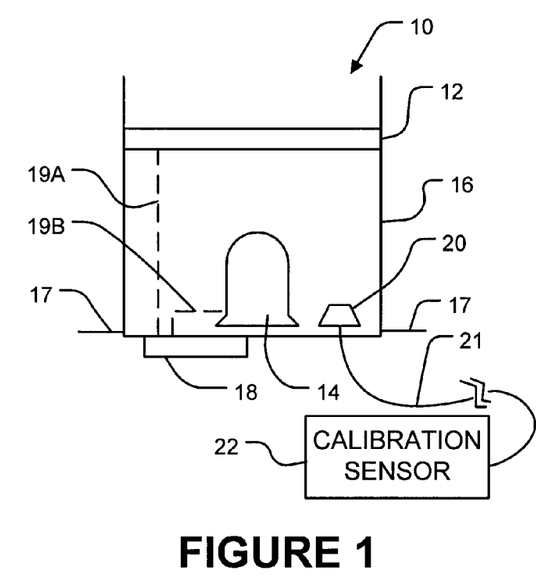
FIG. 1 is a schematic view of a module that can be combined with other modules to provide a display.

FIG. 1 is a schematic view of a module 10 that can be combined with other modules 10 to provide a display. Module 10 has a modulator 12 illuminated by a light source 14. Modulator 12 may comprise a transmission-type modulator, such as a liquid crystal display ("LCD") panel or the like. In typical embodiments, each modulator 12 comprises a 2-dimensional array of independently-controllable pixels.

Light source 14 preferably comprises a solid-state light source such as a light-emitting diode ("LED"). However, other types of light sources may be used in the alternative. In preferred embodiments, light sources 14 have variable light outputs.

Module 10 has a housing 16 that supports modulator 12 and light source 14. Housing 16 may comprise mounting points 17 such as mounting tabs, clips, or the like which allow housing 16 to be mounted to a suitable backplane, as described below. The backplane is typically planar but this is not mandatory.

A connector 18 connects to a corresponding connector. Connector 18 receives signal and power from external sources (not shown in FIG. 1). Within module 10 a signal 19A drives modulator 12 and a signal 19B drives light source 14. Signals 19A and 19B may be received through connector 18 or may be generated in module 10 from other signals received by way of connector 18.

A light sensor 20 may optionally be provided for calibrating the light output of a module 10. In some applications this is necessary because of variations in light sources 14 or the components that control light sources 14. For example, due to manufacturing process variations, different LEDs of the same type may provide different light output even when driven by the same current.

In preferred embodiments, light sensors 20 comprise the ends of optical fibres 21 that carry light to a common sensor 22. Providing a central sensor 22 for calibration purposes avoids having the accuracy of calibration affected by differences between individual sensors or temperature differences between different modules 10. In other embodiments, separate light sensors are provided for each module 10. In some cases, the outputs of light sources 14 is sufficiently predictable that it is not necessary to provide a light sensor 20.

Figure 2:
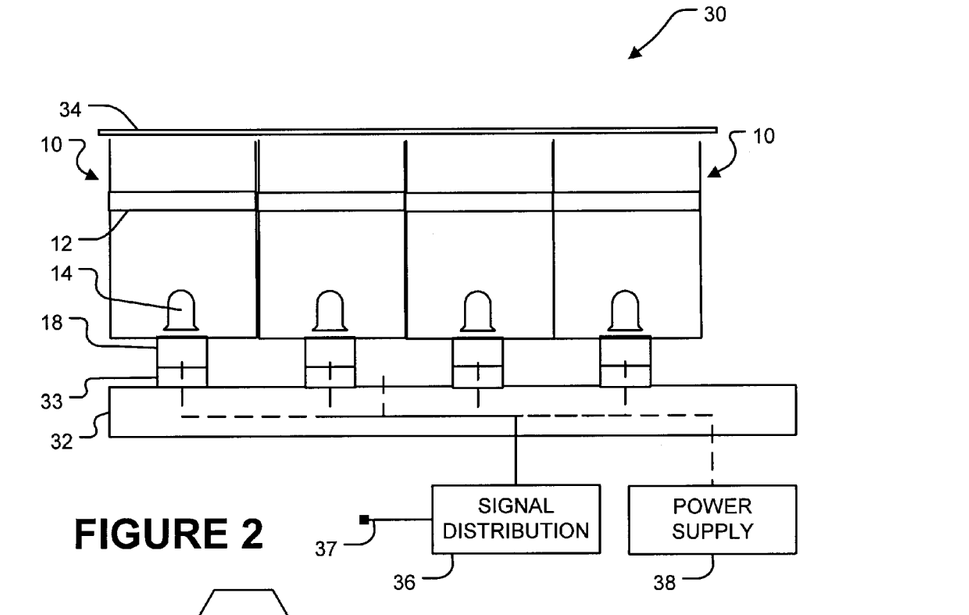
FIG. 2 is a partial schematic view of a display made up of several modules all connected to a backplane.

FIG. 2 is a partial schematic view of a display 30 made up of several modules 10 all connected to a backplane 32. Backplane 32 comprises connectors 33 that mate with connectors 18 of modules 10. Modules 10 may be attached to backplane 32 by the interconnection of connectors 18 and 33 and/or by any suitable fastening mechanism. For example, screws or other fasteners may be provided to hold modules 10 in place on backplane 32.

In some embodiments, backplane 32 is modular. For example, backplane 32 may comprise tiles or strips that each support a plurality of modules 10. A display of a desired size and configuration can be made by assembling together such tiles or strips. In some embodiments, backplane 32 comprises a plurality of modular strips that each provide support for one or more columns or one or more rows of modules 10. The modular strips can be assembled together in a substantially parallel arrangement to provide a display of a desired size.

A screen 34 is illuminated by modules 10. Each module 10 illuminates a corresponding area of screen 34. The areas of screen 34 illuminated by adjacent modules 10 preferably overlap at least slightly. Screen 34 may be patterned to provide a Fresnel lens corresponding to each module 10. Screen 34 preferably has light-diffusing properties so that light is scattered toward the location of a viewer. In the illustrated embodiment, light from multiple modules 10 passes through a single screen 34. In alternative embodiments, screen 34 is modular (e.g. each module 34 may carry a part of screen 34). Screen 34 may be configured to scatter radiation evenly into an elliptical cone.

A signal distribution system 36 distributes driving signals to each module 10. The driving signals cause the display to display content provided at an input 37. Distribution system 36 may provide different driving signals to each module 36 or may provide the same driving signals to each module 10. If distribution system 36 provides the same driving signals to each module 10 then modules 10 each derive signals 19A and 19B from the driving signal. This may be done by extracting parts of the driving signal or by generating new signals based upon the driving signal. A power supply 38 supplies electrical power to modules 10.

Backplane 32 may provide the additional function of controlling the temperature of modules 10. This typically involves dissipating heat generated in modules 10. The heat may be generated, for example, by light source 14 and/or any active electronic devices, logic circuits, control circuits or processors that are in module 10.

In some embodiments backplane 32 supports a system for managing the temperature of modules 10. In some such embodiments, modules 10 comprise thermally conductive paths that collect heat generated by devices in the module 10 and carry the heat to backplane 32. For example, a module 10 may comprise a thermally-conductive post or other member that connects with a heat sink on backplane 32 when the module 10 is attached to backplane 32. The thermally-conductive member is integrated with connector 18 in some embodiments. Heat generated within the module 10 flows out of module 10 into the heat sink.

Figure 1A:
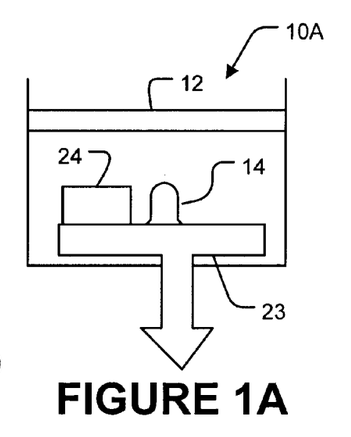
FIG. 1A is a schematic view of a module that includes a thermally-conductive member.

FIG. 1A illustrates a module 10A that includes a thermally-conductive member 23 that is in thermal contact with light source 14 and control electronics 24. Thermally conductive member is configured to connect to a heat sink in a backplane 32.

In other embodiments that include cooling systems, backplane 32 includes channels that carry a flow of cooling air (or other gas) to each module 10. For example, backplane 32 may support one or more fans that generate a flow of air and a suitable system of manifolds for delivering the air to cool modules 10.

Figure 1B:
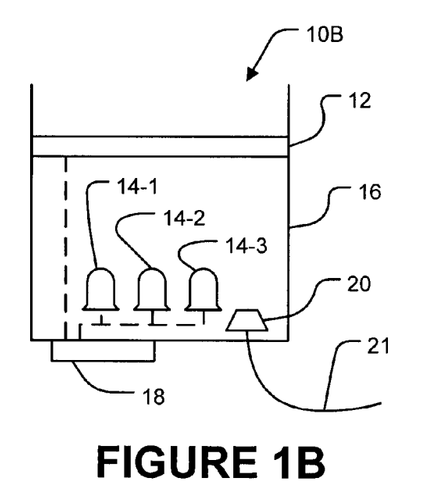
FIG. 1B is a schematic view of a module that has multiple light sources.

Modules 10 may vary in various respects. As shown in FIG. 1B, a module 10B may have multiple light sources 14. The illustrated embodiment shows three light sources 14-1, 14-2, and 14-3. These light sources may be of the same or different colors depending upon the application. In some embodiments, modules 10 have red, green and blue light sources (or another set of light sources that spans a color space suitable for the application). In such cases, there may be one, or more than one light source of each color.

Figure 1C:
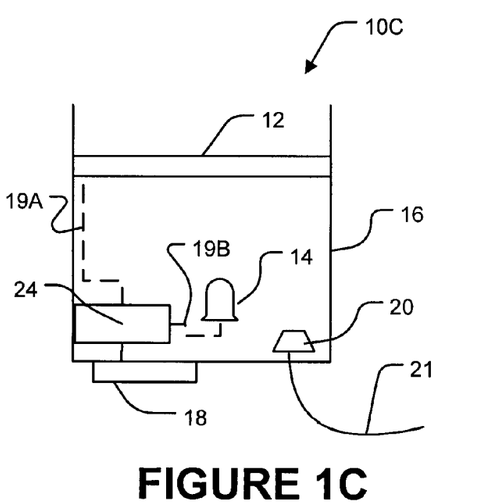
FIG. 1C is a schematic view of a module that includes a control circuit.

FIG. 1C shows a module 10C that includes a control circuit 24 that extracts and/or generates signals 19A and 19B from a signal provided at connector 18. Control circuit 24 may include components such as a microprocessor, associated program memory, associated working memory, hard-wired image processing circuits, field programmable gate arrays (FPGAs) and the like. If the module 10C includes multiple light sources 14 then control circuit 24 may generate separate signal 19B for each light source 14 or, in some cases, for each color of light source 14.

Figures 2A, 2B:
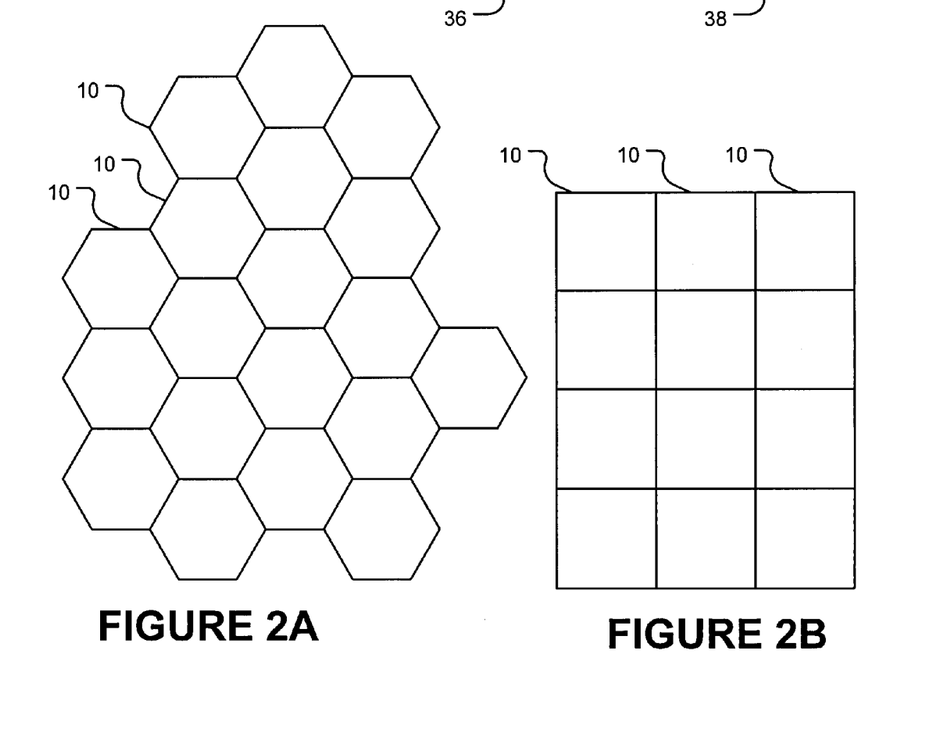
FIGS. 2A and 2B show example alternative ways that modules may fit together to tile the area of a screen.

As shown, for example, in FIGS. 2A and 2B, modules 10 fit together to tile the area of screen 34. FIG. 2A shows hexagonal modules 10. FIG. 2B shows square modules 10. Modules 10 may also be of other shapes that can fit together to cover an area. For example, modules 10 may be triangular, rectangular, cruciate, or the like. It is not mandatory (although it is usually convenient) that all modules be identical in cross-sectional shape.

Modules 10 are not necessarily tightly fitted together. In some embodiments, each module 10 is spaced slightly apart from adjacent modules 10. Modules 10 could also be spaced more widely apart, if desired.

Screen 34 may be flat or curved.

Figure 3:
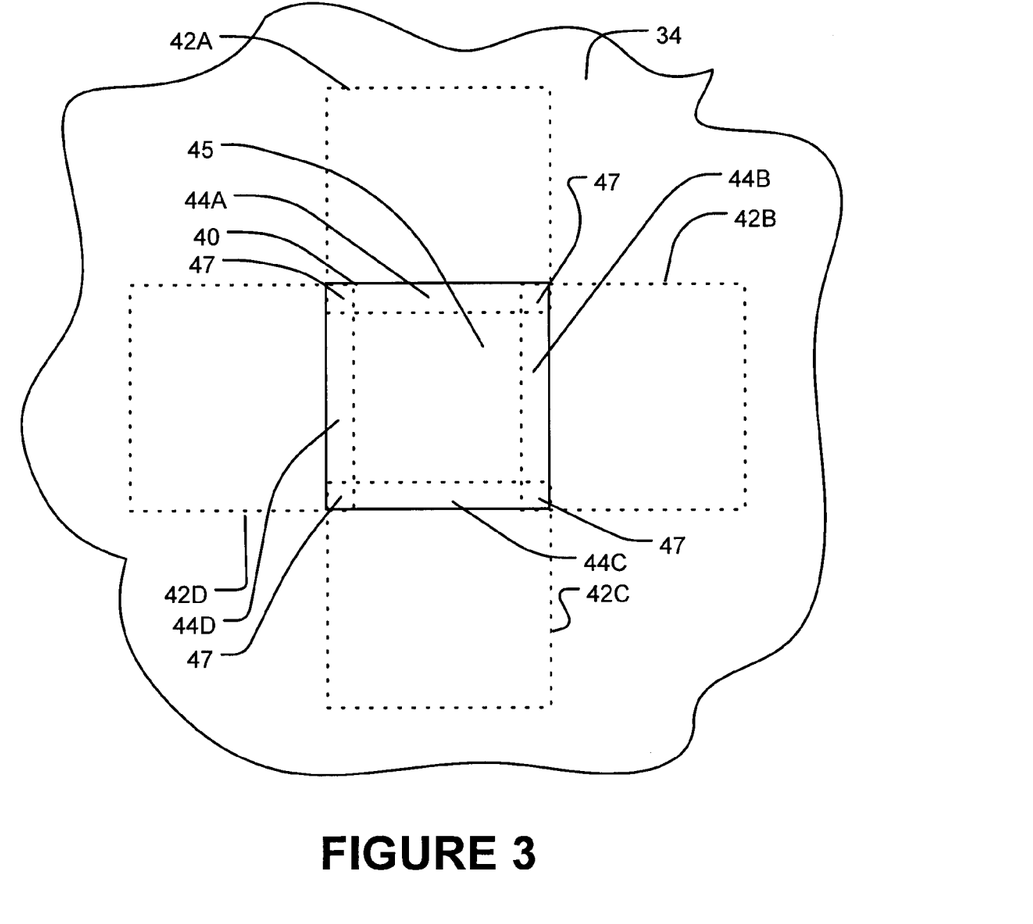
FIG. 3 shows schematically a portion of a screen in a display having square modules.

The walls of housing 16 are preferably opaque such that light from each module 10 passes through a well-defined portion of modulator 12. FIG. 3 shows schematically a portion of a screen 34 in a case where modules 10 are square as shown in FIG. 2B. An area 40 illuminated by a module 10 (not shown in FIG. 3) is shown in solid outline. Area 40 overlaps with areas 42A, 42B, 42C, and 42D illuminated by other modules 10. For example, along strip 44A, area 40 overlaps with area 42A. Along strip 44B, area 40 overlaps with area 42B. Along strip 44C, area 40 overlaps with area 42C. Along strip 44D, area 40 overlaps with area 42D.

In a central area 45 the illumination of screen 34 depends only upon the module 10 corresponding to area 40. In strips 44, screen 34 receives light from two modules 10. In corner areas 47, screen 34 receives light from four modules 10.

Display 30 includes a mechanism for controlling adjacent modules 10 to deliver correct levels of illumination within overlapping areas (i.e. within strips 42 and corners 47 in the embodiment of FIG. 3). The mechanism may include a central processor or processors distributed among modules 10, for example. The mechanism sets drive levels for each light source 14 and modulator 12 such that the sum of the illumination received from all contributing modules 10 at each point in each overlapping area is an illumination level desired for that point.

Suitable drive levels may be obtained by working backward from the desired illumination levels to obtain values for drive signals to light source(s) 14 and modulators 12 that will result in correct illumination levels within the overlapping areas.

It can be appreciated that the displays can be constructed as described herein in ways that can provide various benefits. For example:

- modules 10 may be built primarily from easily-sourced commodity components. This facilitates providing cost-effective displays.
- displays of almost any size and aspect ratio may be made by combining suitable numbers of modules 10.
- a display that becomes defective as a result of problems in one or more modules 10 can be repaired by replacing the defective modules 10.

Figure 4:
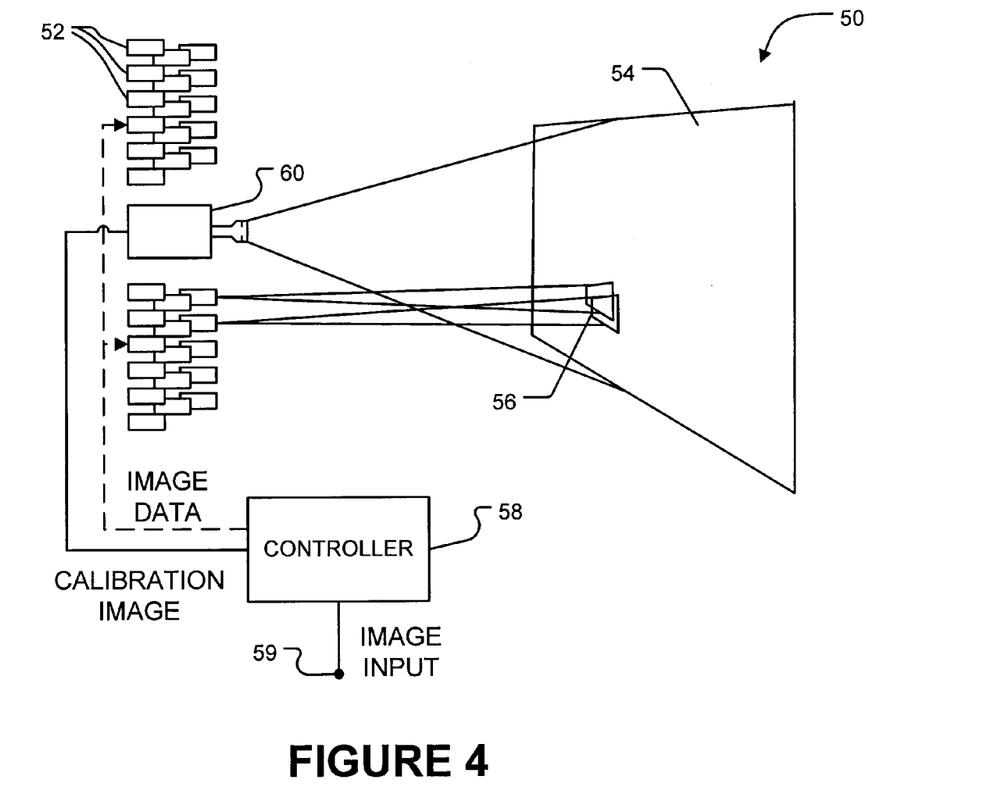
FIG. 4 is a schematic view of an image projection system comprising a plurality of modules.
Figure 5:
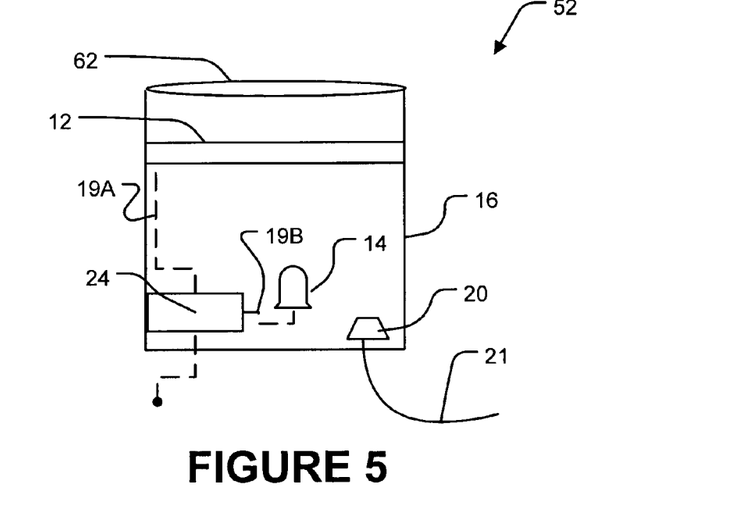
FIG. 5 is a schematic view of a module of a type that may be used in a system like that of FIG. 4.

FIG. 4 shows an image projection system 50 in which a plurality of modules 52 are used to provide a projection-type display. As shown in FIG. 5, modules 52 may be similar in construction to any of modules 10 with the addition, in some embodiments, of a projection optical system 62 that projects an image of modulator 12 onto screen 54. Optical system 62 may comprise any suitable arrangement of lenses, mirrors, and/or other optical elements. In some cases an optical system 62 may direct light at an angle to the optical axis of module 52. For example, an optical system 62 may deflect light from a centrally-located module 52 to illuminate an area 56 in a corner of screen 54. In some embodiments each module 52 has its own optical system 62.

In some cases where screen 54 is far enough away from modules 52 it may be unnecessary to provide an optical system 62 on the outer side (i.e. the screen side) of modulator 12 as the light sources of modules 52 may produce light that is well-enough collimated to image the modulator 12 onto screen 54 without focusing on the screen side of modulator 12.

Each module 52 projects onto a corresponding area 56 of screen 54. System 50 includes enough modules 52 so that the entire area of screen 54 is covered by areas 56 corresponding to the modules 52. Typically at least most of modules 52 have corresponding areas 56 that are much smaller than screen 54. For clarity, FIG. 4 shows only two areas 56. Every spot on screen 54 preferably lies within two or more areas 56. Most preferably, every spot on screen 54 lies within 4 or 5 more areas 56. In currently preferred embodiments of the invention, each point on at least a main viewing area of screen 54 lies within 5 to 15 areas 56. It is not necessary that there be the same number of overlapping areas 56 at every point on screen 56.

Modules 52 should be mounted rigidly so that the locations and orientations of the corresponding areas 56 do not move on screen 54. Modules 52 may be mounted on one or more backplanes 32 as described above, or modules 52 may be mounted in some other manner. For example, modules 52 may be mounted individually or in bundles. Modules 52 may be arranged in one or multiple banks of modules or may be distributed individually. System 50 may include a large number of modules 52. For example, some embodiments of system 50 include 1000 to 15,000 modules 52.

Modules 52 may be located in any suitable locations including the ceiling of a theater or other room. Modules 52 may optionally be thermally coupled to air conditioning or other air ducts to help to maintain modules 52 within a desired operating temperature range.

Signals and electrical power may be provided to modules 52 in any suitable manner. A single video and power cable or data bus may extend to all modules 52. In the alternative, separate power and video cables may connect to different modules 52 or different groups of modules 52. Modules 52 may receive signals by way of wires, optical fibres, or wireless communication methods. Communication of signals to modules 52 may be simplified because the same data may be provided to all of modules 52 (or, in some embodiments, all modules 52 of each color).

A controller 58 provides image data to modules 52. Each module 52 emits a pattern of light according to the image data. The image data is, or is based on, data received at an image input 59. With modules as illustrated in FIG. 5, the pattern of light is determined by the intensity at which light source 14 is operated as modulated, on a pixel-by-pixel basis by modulator 12.

It is possible, but not necessary, to carefully align modules 52. The orientations and locations of the areas 56 corresponding to the different modules 52 may be essentially random as long as every point on the viewing area of screen 54 is covered with an appropriate number of overlapping areas 56. Areas 56 are not necessarily all the same shape or size. Areas 56 are not necessarily squares, rectangles or other regular shapes. For example, in some embodiments, areas 56 may be trapezoidal or elliptical, partly or entirely as a result of the angles at which the corresponding modules 52 are directed at screen 54.

Areas 56 are not necessarily the same size. Different modules 52 may have projection optics which cause the modules to cover differently-sized areas 56. For example, some modules 52 may have wide-angle lenses which cause the corresponding areas 56 to be large, possibly, in some cases, covering a significant fraction of the entire screen 54 or even the entire screen 54. Other modules 52 may have optics that cause the corresponding areas 56 to be quite small.

Arranging modules 52 so that areas 56 are not arranged in a regular pattern avoids the creation of visible seams in the overall image. It also makes it much easier to install and align modules 52.

FIG. 5 is a schematic view of a module 52. Elements of module 52 are labeled using the same reference numerals used for corresponding elements of module 10. In preferred embodiments, the brightness of light source 14 can be controlled over a reasonable range. For example, light source 14 may be driven by an 8-bit driver that provides 256 brightness levels.

To achieve a bright image on screen 54 it is desirable that modules 52 be optically efficient. One way to make modules 52 optically efficient is to make modulator 12 a monochrome modulator. The color of the light emitted by the module 52 can be determined primarily by the color of light source 14 or, less desirably by a color filter. In embodiments that employ monochrome modules, system 50 may include modules 52 having light sources that emit different colors of light. For example, some modules 52 may have sources of red light, others may have sources of green light and others may have sources of blue light. In such embodiments, it is desirable that areas 56 corresponding to two or more, and preferably three or more modules 52 of each color should overlap at each point in the viewing area of screen 54. A system 50 may include modules 52 of three or more colors chosen to provide a suitable color gamut for the images to be displayed.

The optical efficiency of a module 52 may be further increased by making modulator 12 have a relatively low resolution. Lower-resolution modulators tend to have higher fill-factors than higher-resolution modulators. This typically results in higher overall optical efficiency. For example, modulators 12 may have a resolution of a few-dozen to a few hundred pixels in each direction. For example, in some embodiments, light modulators 12 have fewer than 500 pixels in at least one direction. In some embodiments, light modulators 12 have fewer than $2^{20}$ pixels. In one embodiment, modulators 12 have resolutions of 320 by 240 pixels.

Where modulator 12 preferentially passes light of a particular polarization state, light source 14 may be selected and arranged to emit light in the polarization state that is preferentially passed by modulator 12. For example, where modulator 12 is an LCD that passes light that is linearly polarized in a certain direction, light source 14 may be an LED that emits polarized light and the LED may be aligned so that the polarization of the emitted light is aligned with the polarization direction of the LCD.

In cases where each module 52 generates light of one color, it is possible to operate each module 52 at a reduced refresh rate in comparison to systems that use one modulator to time-multiplex several colors.

System 50 includes a camera 60 located to take images of screen 54. Camera 60 may be used in various ways. Camera 60 is a high-resolution camera. A primary use for camera 60 is for calibrating system 50. Since camera 60 is required only for calibration purposes, camera 60 does not need to be present except during calibration of a system 50. For example, a single camera 60 may be shared among several systems 50.

In some embodiments, camera 60 may be connected to a system that performs calibration while system 50 is operating. In such embodiments the calibration system may monitor the intensity of light at various combinations of points over time and, from the monitored intensities and the image data, obtain information regarding the calibration of individual modules (e.g. obtain information regarding the brightness provided by one or more modules, or pixels or groups of pixels thereof, in response to brightness values specified by the image data) or the accuracy of the responsibility maps for individual modules (e.g. obtain information defining the area 56 corresponding to each module 54). The information may be obtained, for example, by performing statistical analysis of the monitored intensities.

Figure 6:
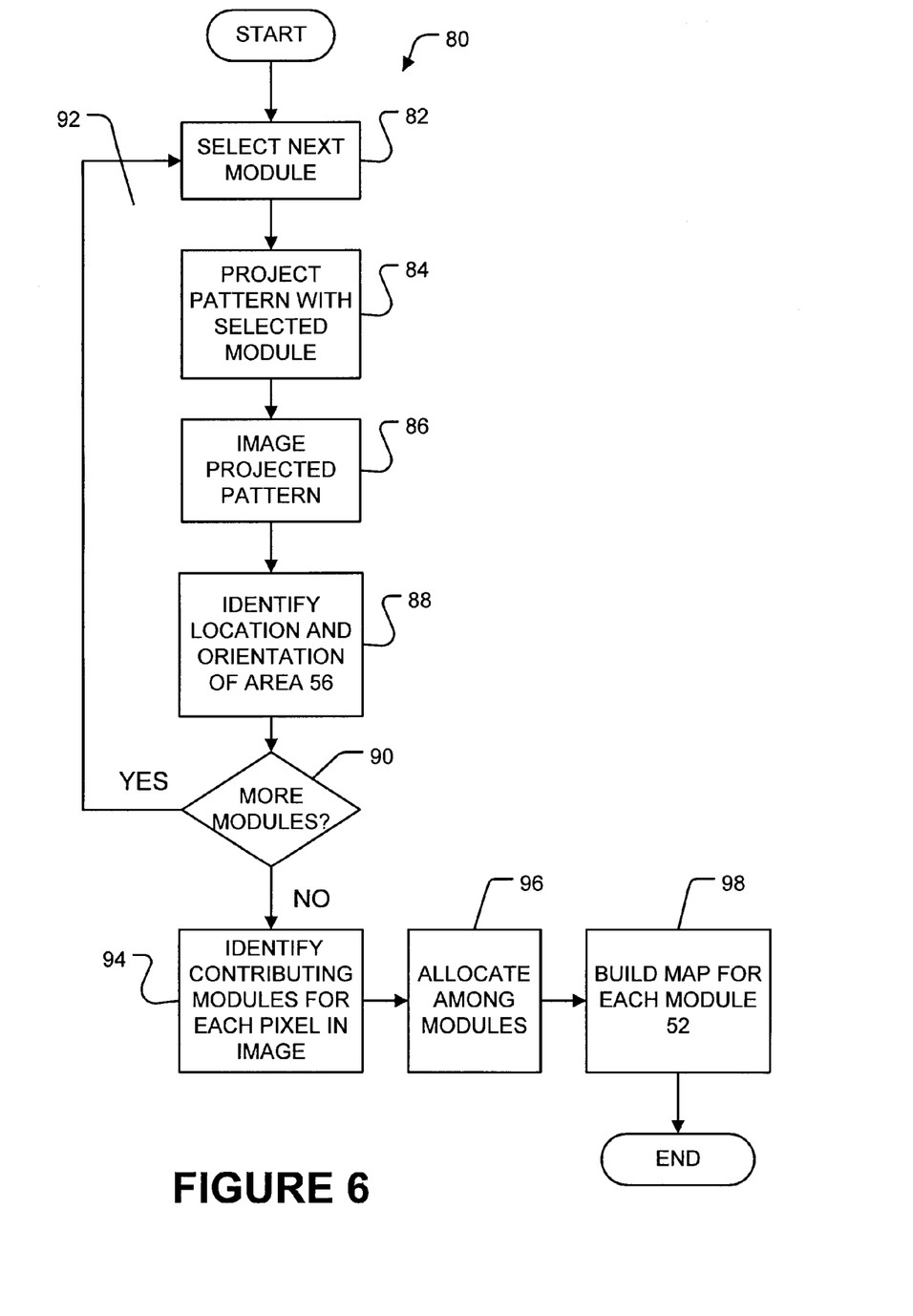
FIG. 6 is a flow chart illustrating a method that may be practiced in the initial set up of a system like that of FIG. 4; and, FIG. 7 is a playback method that may be performed at each module in a display wherein the modules have on-board processing.

FIG. 6 is a flow chart illustrating a method 80 that may be practiced in the initial set up of system 50. Method 80 may be practiced separately for each color. Method 80 may be performed by a processor in controller 58 operating under the control of software. It is only necessary to perform method 80 once when system 50 is first set up or when it is desired to recalibrate system 50 for some reason.

In block 82 a module 52 is selected. In block 84 a pattern is projected from the selected module. In block 86 the projected pattern is imaged by camera 60. In block 88, image processing functions are applied to determine the location and orientation of the area 56 corresponding to the currently-selected module 52.

Blocks 84, 86 and 88 may be performed simultaneously for two, or even several modules 10 if the areas 56 corresponding to the two, or several, modules can be distinguished from one another. For example:

- Where camera 60 is a color camera, modules projecting light of different colors may be operated at the same time to project onto corresponding areas 56. The colors may be used to identify the area 56 corresponding to each of the modules.
- Different modules that are known to project light on different parts of screen 54 may be operated at the same time and the resulting light patterns imaged by camera 60 at the same time. For example, the screen may be divided into quadrants and modules 52 that are known to project into different quadrants may be operated and imaged at the same time.
- Modules 52 may be operated simultaneously to project light patterns that can be readily distinguished from one another. The image obtained by camera 60 may then be processed to correlate areas 56 in the image with the corresponding module 52 by identifying the patterns.
- Some combination of the above, or the like.

In block 90 a decision is made as to whether there are more modules 52 to process. If so, loop 92 is repeated until all of modules 52 have been processed.

In block 94, method 80 determines which modules 52 contribute to each pixel on the image displayed on screen 54. In block 96, for any pixels which are contributed to by two or more modules 52, responsibility for the pixel is allocated among the modules 52. The allocation may be, but is not necessarily equal. For example, if a pixel on screen 54 can be illuminated by five different modules 52, each of those five modules 52 may be given $\frac{1}{5}$ responsibility for that pixel. The responsibility may take into account the measured brightness of the image projected by the module 52. This way the method can automatically compensate for variations in brightness among light sources 14 of different modules 52.

In block 98, a map is built for each module 52. The map identifies pixels of the image on screen 54 for which the module 52 has full or partial responsibility. The responsibility map also specifies a correlation between pixels of the image on screen 54 and pixels of modulator 12 of the module 52. The responsibility map for each module is stored. The responsibility map may comprise an image at the same resolution as images to be displayed by system 50 on screen 54. For each module 52, the responsibility map is "black" (i.e. has values indicating that the module 52 has no responsibility) for pixels of the image outside of the area 56 corresponding to the module 52. In the responsibility map, pixels of the image inside of the area 56 corresponding to the module 52 have values depending upon the amount of responsibility allocated to the module 52 in block 96.

For example, consider the case where, for a particular pixel in the image on screen 54, twelve areas 56 overlap. In this case, each of the 12 modules 52 may be allocated $\frac{1}{12}$ responsibility for the pixel. That pixel in the responsibility maps for the 12 modules 52 could have a value of $\frac{1}{12}$ while that pixel in the responsibility maps for other modules 52 could have a value of 0.

The responsibility maps may be stored in the corresponding modules 52 or in other locations accessible to processors responsible for controlling the operation of modules 52. In some embodiments, a separate processor is provided for each module 52. The processor and storage for the responsibility map may be included in the control circuits 24 of the module 52.

Optionally, the responsibility maps may be modified to provide overall adjustments to the image. For example, the responsibility map may be adjusted to reduce overall brightness from the center of screen 54 to edges of screen 54 or the like.

Figure 7:
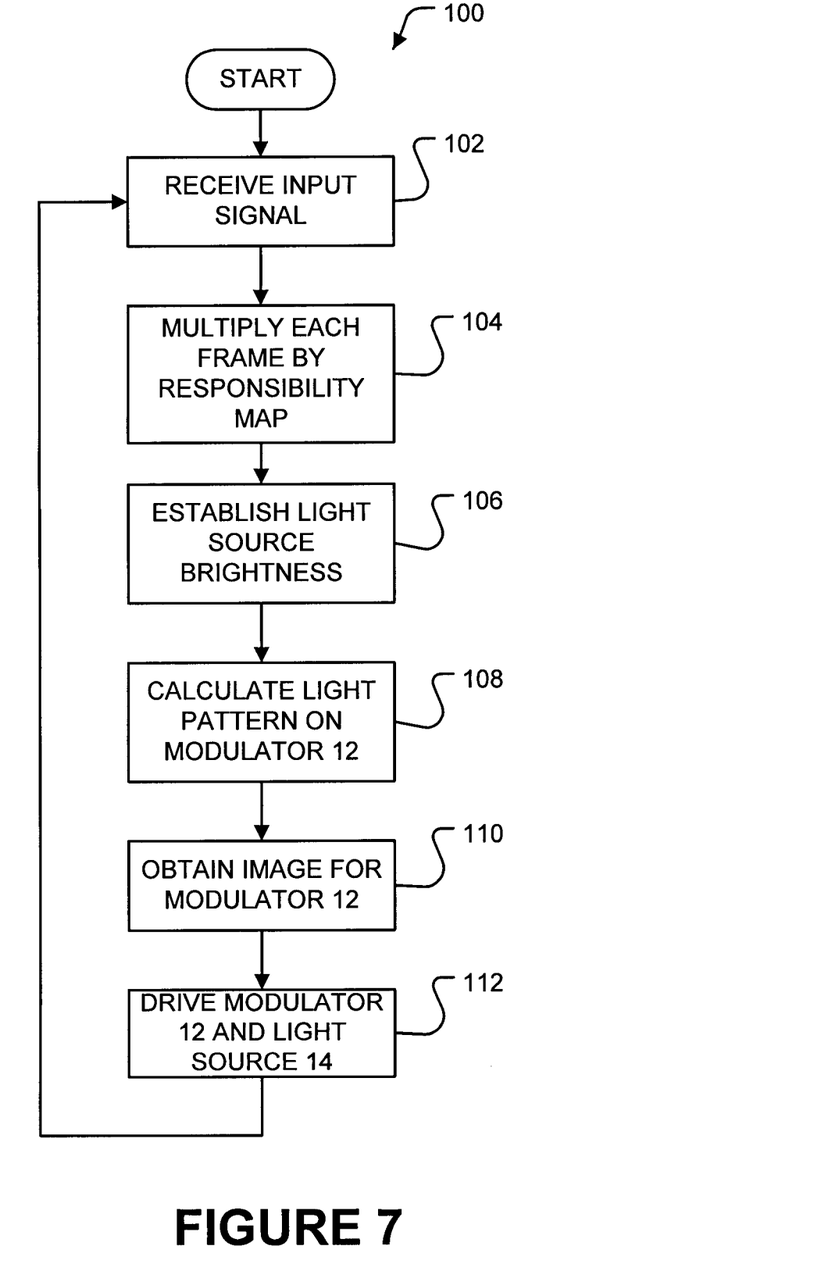

Providing responsibility maps for each module 52 permits simplified playback of video or other images on system 50. FIG. 7 illustrates a playback method 100 that may be performed at each module 52. The same video data may be provided as an input signal to every module 52. In block 102 the module 52 receives the signal. In each module 52 method 100 is performed for only one color.

In block 104 a frame in the signal is multiplied by the responsibility map. This yields a reduced image much smaller than the full frame. In block 106 a brightness for light source 14 is determined based upon the reduced image. This may be done in any suitable way. For example, block 106 may be performed in the manner described in U.S. Pat. No. 6,891,672 which is hereby incorporated herein by reference.

In block 108 the pattern of light that will be produced by light source 14 on the pixels of modulator 12 is determined. This computation will typically be quite simple as each module 52 typically includes only one light source 14 and the module 52 may be designed so that the light source 14 illuminates modulator 12 at least fairly evenly.

In block 110 the reduced image from block 104 is divided by the light pattern determined in block 108 for each pixel of modulator 12 to obtain driving values for each pixel of modulator 12. Typically, the arrangement of pixels of modulator 12 will not be precisely aligned with the image to be displayed on screen 54. Therefore, block 110 typically includes a step of mapping image pixels of the reduced image to be displayed to the pixels of modulator 12 that contribute to those image pixels. In block 112, light source 14 and modulator 12 are driven with the values determined in blocks 106 and 110 to project a portion of the image onto screen 54. The images projected by all of modules 52 merge to create the entire projected image.

It can be seen that method 100 can be performed with relatively few operations. Method 100 can be performed for each module 52 with a relatively simple processor. The main operations required to perform method 100 are only:

a single per-pixel multiply operation at the resolution of the incoming video signal;

a single per-pixel divide operation at the much lower resolution of modulator 12.

Since each module 52 displays only one color, the refresh rate of each module 52 can be relatively slow. For example, 24 Hz or so. The refresh rate of modules 52 may be the same as the frame rate of the image signal provided to modules 52. Optionally, light sources 14 may be flashed on and off a few (e.g. two or three times) per cycle (i.e. per frame in the case where video is being displayed). Flashing the light sources 14 on and off provides a higher flicker frequency.

Power consumption of a system 50 can be reduced through the use of optically efficient modules 52. For example, consider a system 50 comprising 10,000 modules 52. If a particular screen requires a maximum illumination of 10,000 Lumens of luminous flux then each module 52 must produce only 1 Lumen. If modulators 12 comprise high-efficiency monochrome LCD panels having optical efficiencies of 40% then light sources 14 would need to produce about 2½ Lumens. A 50 mW LED can produce about 2½ Lumens. Thus such a system 50 would have a power consumption of only 50 mW×10,000=1 kW plus the power required to run any control circuitry. This compares favorably to the 3 kW power consumption of conventional cinema projectors. Power consumption can be minimized by the use of high-efficiency modulators 12.

It can be appreciated that a system 50 may have at least some of the following advantages:

The image on screen 54 may be made very large by providing a sufficient number of modules 52;

If a module 52 fails it may be replaced without affecting other modules 52—in the alternative, calibration method 80 can be performed without the defective module 52, this will result in other modules 52 compensating for the missing module 52;

Since method 80 is based upon images of light projected onto screen 54, the method can compensate automatically for the presence of dirt, damage or other imperfections in screen 54;

The effective resolution of images displayed on screen 54 is increased due to the large total number of pixels in system 50. The effective resolution is increased further by the spatial dither resulting from the fact that each pixel of the projected image is composed of several (e.g. an average of 10 or so) pixels from modules 52;

The dynamic range of images that can be displayed on screen 54 is increased;

Individual modules 52 can be cost effective because modulators 12 can be relatively very small monochrome light modulators;

The small size of modules 52 and the fact that modules 52 can be distributed in locations such as ceilings, walls and the like provides design flexibility. A theater equipped with a system 50 would not require a separate projection room as is required to contain a traditional cinema projection system.

Various modifications to the displays depicted in FIGS. 4 to 7 are possible. For example:

In addition to red-, green- and blue-emitting modules 52, modules 52 of other colors may be provided. Such modules may permit the display of images with a wider color gamut. For example, yellow- and cyan-emitting modules 52 may be provided in a system 50.

The system 50 may include different numbers of modules 52 that project light of each of several different colors. The areas 56 corresponding to modules of different colors may be of different sizes.

Modulator 12 may comprise a reflection-type modulator instead of a transmission-type modulator. For example, modulator 12 may comprise a digital mirror device ("DMD"). Appropriate optical systems may be provided to route light from a light source to a reflection-type modulator and to project light onto screen 54 after it has been modulated by the modulator. Suitable optical systems are routine in the art and are therefore not described in detail herein.

A system may be made up of two groups of modules 52. A first group emits light of a first polarization and a second group emits light having a second polarization orthogonal to the first polarization. Such modules may be equipped with polarizing filters. The polarizing filters may be integrated with modulators 12 or may be separate. In the alternative, or in addition, such modules may have light sources 14 that produce polarized light. Such a system can be used in conjunction with viewing spectacles having orthogonal polarizing filters to provide 3-dimensional images.

In some cases it may be desirable to provide separate source images for different regions of screen 54. In such cases, each module 52 needs only to receive the source image signal for its region of screen 54. This reduces the volume of data to be processed at each module 52 and consequently, eases the data processing burden on the data processor handling the module 52.

The processors associated with modules 52 may perform additional functions such as blur correction. Various suitable blur correction algorithms are known to those skilled in the field of image processing.

A system 50 may be configured as a rear-projection system or a front-projection system. Where system 50 is configured as a rear-projection system it is desirable to place camera 60 on the viewing side of screen 54.

Partial benefits of the invention may be obtained by providing modules 52 in which only modulator 12 is controlled in response to image data and light source 14 remains operating at a substantially constant output.

Some modules may project light of two or more colors (i.e. it is not mandatory that all modules be monochrome modulators).

Certain implementations of the invention comprise computer processors which execute software instructions which cause the processors to perform a method of the invention. For example, one or more processors in a system 50 may implement the methods of FIGS. 6 or 7 executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program products may comprise, for example, physical media such as magnetic data storage media including floppy diskettes, hard disk drives, optical data storage media including CD ROMs, DVDs, electronic data storage media including ROMs, PROMs, flash RAM, or the like. In some cases, the program products may comprise transmission-type media such as digital or analog communication links. The computer-readable signals on the program product may optionally be compressed or encrypted. In some embodiments, the program product comprises firmware in a controller 58 of a system 50 or in control circuits 24 associated with a module 52.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

In systems having an overall structure similar to that of FIG. 4, color may be provided in any of various different ways. These include providing monochrome modules of at least two and, in most cases three or more different colors or providing modules that each project a color image. Where modules each project a color image, the color image may be obtained in various ways including: providing a color modulator in each module or providing a monochrome modulator operating in a field sequential mode wherein a color of light incident on the modulator is changed for each of a series of fields. The color of light incident on the modulator may be varied by interposing different filters in the light path or by turning on light sources of different colors. For example, each module could include red, green and blue LEDs driven in a field-sequential mode to illuminate a monochrome LCD light modulator. The LEDs may be operated cyclically to issue R, G and B light at a relatively high frequency. The LCD may be operated in synchronization with the cycling of the light sources to present images to be displayed in red, green and blue respectively.

Accordingly, the scope of the invention is to be construed in accordance with the substance defined by the following claims.

What is claimed is:

1. A display comprising:
a plurality of modules, each of the plurality of modules comprising a light source and a spatial light modulator disposed to modulate light emitted by the light source in response to image data; and,
a screen illuminated by the plurality of modules;
wherein each of the modules is capable of illuminating a corresponding area of the screen and the areas of the screen illuminated by different ones of the modules overlap with one another; and
wherein each of the modules comprises a control circuit that is connected to receive a data signal carrying the image data and is configured to generate a driving signal for the light modulator based upon the image data and is associated with a computer-accessible responsibility map, the responsibility map comprising an image at a resolution that is the same as a resolution of an image to be displayed by the display on the screen, the responsibility map identifying those pixels of the image data for which the module is not responsible and those pixels of the image data for which the module has full or partial responsibility and, for each of those pixels for which the module has partial responsibility, identifying a fractional amount of responsibility of the module for the pixel, the responsibility map further specifying a correlation between pixels of the image to be displayed on the screen and pixels of the spatial light modulator of the module;
wherein the control circuits in a plurality of different ones of the modules are connected to receive the same data signal and the control circuit in each of the plurality of different ones of the modules is configured to, using the responsibility map: extract a portion of the image data relevant to the module; map pixels of the extracted portion of the image data to corresponding pixels of the spatial light modulator; and generate the driving signal based upon the extracted portion of the image data and the corresponding amount of responsibility of the module for the pixel; and
wherein for each module, intensities of light from the pixels of the light modulator of the module corresponding to pixels of the image data for which the module has partial responsibility, are controllable by the control circuit based on: the fractional amount of responsibility allocated to the module for the pixel by the responsibility map; and the image data corresponding to the corresponding pixel of the image data such that the intensities of light from the pixels of the light modulator of the module are adjusted in proportion to the amount of responsibility of the module for the pixel according to the responsibility map when the amount of responsibility allocated to the module is greater than 0% and less than 100%.

2. A display according to claim 1 wherein the light source of each of the plurality of modules comprises one or more light-emitting diodes.

3. A display according to claim 1 wherein each of the plurality of modules comprises a first driving circuit connected to control an intensity of light emitted by the light source according to a first control signal and a second driving circuit connected to control an amount of light passed by the light modulator according to a second control signal.

4. A display according to claim 3 wherein in each of the modules the control circuit is configured to generate the first and second control signals in response to the image data.

5. A display according to claim 1 wherein each of the plurality of modules is detachably affixed to a support structure.

6. A display according to claim 5 wherein the support structure comprises a plurality of sections that are detachably affixed to one another.

7. A display according to claim 6 wherein the sections comprise strips, each of the strips extending across the display, each of the strips supporting a plurality of the modules.

8. A display according to claim 6 wherein the sections comprise tiles, each of the tiles supporting a plurality of the modules.

9. A display according to claim 5 wherein each of the modules comprises a first power connector, and the first power connector connects to a second power connector corresponding to the module and mounted to the support structure when the module is affixed to the support structure.

10. A display according to claim 5 wherein each of the modules comprises a thermally-conductive member in thermal contact with one or more heat-generating components of the module and the thermally-conductive member is also in thermal contact with a heat sink in the support structure.

11. A display according to claim 10 wherein the thermally-conductive member is integrated with the first connector.

12. A display according to claim 1 wherein each of the plurality of modules comprises a light sensor located to collect light emitted by the light source and to generate a signal indicative of an intensity of the emitted light.

13. A display according to claim 12 wherein the light sensor in each of the plurality of modules comprises an end of an optical fiber disposed within the module and the optical fibers carry the emitted light to a common light transducer that generates an electrical signal indicative of the intensity of the light.

14. A display according to claim 13 wherein the optical fibers are anchored to a support structure of the display.

15. A display according to claim 1 wherein each of the plurality of modules comprises light sources of a plurality of different colors.

16. A display according to claim 1 wherein the light source of each of the plurality of modules is one of a plurality of different colors.

17. A display according to claim 1 wherein, in each of the plurality of modules, the light source emits polarized light, the modulator preferentially passes light that is polarized along a polarization axis, and the light emitted by the light source is polarized substantially along the polarization axis.

18. A display according to claim 1 wherein each of the plurality of modules comprises a housing that is opaque to the light emitted by the light source and the housing extends around the light source so as to block the exit of light from the module except through the light modulator.

19. A display according to claim 1 wherein, in each of the plurality of modules, the light modulator has a resolution of less than 500 pixels in at least one direction.

20. A display according to claim 1 wherein, in each of the plurality of modules, the light modulator has fewer than $2^{20}$ controllable pixels.

21. A display according to claim 1 wherein, for each point in a viewing area of the screen, at least five of the modules are operable to illuminate corresponding areas of the screen that include the point.

22. A display according to claim 21 wherein, for a plurality of different points on the screen, a different number of modules of the display have corresponding areas that include the point.

23. A display according to claim 22 wherein the screen includes at least some points for which the number of modules of the display that have corresponding areas that include the point exceeds nine and the screen includes some other points for which the number of modules of the display that have corresponding areas that include the point is less than seven.

24. A display according to claim 1 wherein the plurality of modules are arranged at different distances from the screen.

25. A display according to claim 1 wherein at least some of the plurality of modules are mounted at locations that are higher than a top edge of the screen.

26. A display according to claim 25 wherein at least some of the plurality of modules are mounted to a ceiling of a building in which the screen is located.

27. A display according to claim 26 wherein at least some of the plurality of modules comprise a heat-conducting member in thermal contact with one or more heat-generating components of the module wherein the heat-conducting member extends into an air conditioning duct in the ceiling of the building.

28. A display according to claim 1 comprising a digital camera located to image the screen and a control processor configured to perform a calibration routine for building the responsibility maps, the calibration routine comprising:
operating each of the modules to display on the screen a pattern indicative of the location of the corresponding area of the screen for the module;
acquiring an image of the displayed image with the camera; and,
generating the responsibility map by processing the acquired image.

29. A display according to claim 1 wherein the screen is a front projection screen and the modules are located on a viewing side of the screen.

30. A display according to claim 1 wherein the screen is a rear projection screen and the modules are located on a side of the screen opposite to a viewing side of the screen.

31. A display according to claim 1 wherein the plurality of modules include light sources that emit light of at least two different colors.

32. A display according to claim 1 wherein the light modulator of each of the plurality of modules is a monochrome light modulator.

33. A display according to claim 1 wherein one group of the plurality of modules emits light that is polarized in a first direction and another group of the plurality of modules emits light that is polarized in a second direction, wherein the first and second directions are substantially perpendicular to one another.

34. A display according to claim 1 wherein the modules include a first group of modules emitting light of a first color and a second group of modules emitting light of a second color different from the first color.

35. A display according to claim 1 wherein each of the modules illuminates an area on the screen and the screen comprises a plurality of Fresnel lenses with one of the Fresnel lenses in the area illuminated by each of the modules.

36. A display according to claim 35 wherein the screen comprises scattering centers that scatter light toward a viewing location.

37. A display according to claim 36 wherein the scattering centers scatter radiation evenly into elliptical cones.

38. A display according to claim 1 wherein the screen is substantially planar.

39. A display according to claim 1 wherein the screen is curved.

40. A display according to claim 1 wherein the areas of the screen illuminated by adjacent ones of the plurality of modules overlap with one another along strips that are narrow relative to the areas of the screen.

41. A display according to claim 40 wherein in each of the modules the control circuit comprises a processor configured to set drive levels for the pixels of the light modulator that correspond to points within the strips so as cause the sum of the illumination received from all contributing modules at the points to have desired illumination levels.

42. A display according to claim 1 wherein, for those pixels for which two or more of the modules are responsible, responsibility is allocated equally among the modules.

* * * * *